United States Patent
Fan et al.

(10) Patent No.: US 11,153,293 B1
(45) Date of Patent: Oct. 19, 2021

(54) IDENTITY INFORMATION LINKING

(71) Applicant: Slack Technologies, Inc., San Francisco, CA (US)

(72) Inventors: Bertrand Fan, San Francisco, CA (US); Salman Suhail, San Francisco, CA (US); Paige Kehoe, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/171,924

(22) Filed: Feb. 9, 2021

(51) Int. Cl.
*H04L 29/06* (2006.01)
*G06F 16/955* (2019.01)

(52) U.S. Cl.
CPC .......... *H04L 63/08* (2013.01); *G06F 16/9566* (2019.01); *H04L 63/101* (2013.01); *H04L 63/102* (2013.01); *H04L 63/108* (2013.01)

(58) Field of Classification Search
CPC ..... H04L 63/08; H04L 63/108; H04L 63/102; H04L 63/101; G06F 16/9566
See application file for complete search history.

(56) References Cited

U.S. PATENT DOCUMENTS

| | | | | |
|---|---|---|---|---|
| 2010/0077444 A1* | 3/2010 | Forristal | ............. | H04L 41/0886 726/1 |
| 2011/0197070 A1* | 8/2011 | Mizrah | ................... | H04L 63/18 713/176 |
| 2017/0041296 A1* | 2/2017 | Ford | ..................... | G06F 16/951 |
| 2018/0287982 A1* | 10/2018 | Draeger | .................. | H04L 51/16 |
| 2019/0190863 A1* | 6/2019 | Baker | .................. | H04L 63/101 |
| 2020/0128002 A1* | 4/2020 | Khanna | ................ | H04L 9/3239 |
| 2020/0342094 A1* | 10/2020 | Agarwal | ............... | G06F 21/602 |

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

(Continued)

*Primary Examiner* — Khoi V Le
(74) *Attorney, Agent, or Firm* — Erise IP, P.A.

(57) ABSTRACT

A system, method, and computer-readable media for linking identify information between a group-based communication system and an external application based on a user authorization to share credentials. After sharing the user's credentials, the user may be authenticated with the external application and user data from the group-based communication system may be shared with the external application. Additionally, a preview of a web resource associated with the external application may be displayed to the user within the group-based communication system allowing the user to interact with the web resource from within the group-based communication system.

17 Claims, 10 Drawing Sheets

(56) References Cited

OTHER PUBLICATIONS

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", FUJITSU Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3:25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

IDENTITY INFORMATION LINKING

TECHNICAL FIELD

Embodiments of the invention relate to linking user accounts. More specifically, embodiments of the invention relate to linking information between a group-based communication system and an external application.

Typically, a hyperlink to a web resource may be shared along with a message in a group-based communications environment. However, in some cases, the web resource with which the hyperlink is associated may require additional authentication. For example, a user may be required to sign-in to a third-party user account in order to view a web resource. Additionally, previews of the web resource may be included. However, these previews may not be configurable and provide no means for users to interact with the web resource from within a group-based communication system.

Accordingly, what is needed is a means to provision new user accounts, link existing user accounts, and display an interactive preview within a group-based communication system.

SUMMARY

Embodiments of the invention solve the above-mentioned problems by providing a system, method, and computer-readable media for linking identity information.

A first embodiment of the invention is directed to one or more non-transitory computer-readable media storing computer-executable instructions that, when executed by a processor, perform a method for linking identity information between a group-based communication system and an external application, the method comprising displaying, within a channel of the group-based communication system, a hyperlink, receiving, from a user, an actuation of the hyperlink within the group-based communication system, wherein the user is not logged into a user account associated with the external application when the actuation is received, in response to detecting the actuation of the hyperlink, determining whether the user has previously authorized credential sharing with the external application, in response to determining that the user has not previously authorized the credential sharing with the external application, prompting the user to share authentication credentials with the external application, in response to detecting user approval, sending the authentication credentials to the external application, in response to receiving confirmation that the user is authenticated by the external application, providing access, to a resource associated with the hyperlink without requiring the user to log into the external application user account.

A second embodiment of the invention is directed to a method for linking identity information between a group-based communication system and an external application, the method comprising displaying, within a channel of the group-based communication system, a hyperlink, receiving, from a user, an actuation of the hyperlink within the group-based communication system, wherein the user is not logged into a user account associated with the external application when the actuation is received, in response to detecting the actuation of the hyperlink, determining whether the user has previously authorized credential sharing with the external application, in response to determining that the user has not previously authorized the credential sharing with the external application, prompting the user to share authentication credentials with the external application, in response to detecting user approval, sending the authentication credentials to the external application, in response to receiving confirmation that the user is authenticated by the external application, providing access, to a resource associated with the hyperlink without requiring the user to log into the external application user account.

A third embodiment of the invention is directed to a system for linking identity information within a group-based communication system, the system comprising a data store, and a processor programmed to perform a method for linking identity information between the group-based communication system and an external application, the method comprising displaying, within a channel of the group-based communication system, a hyperlink, receiving, from a user, an actuation of the hyperlink within the group-based communication system, wherein the user is not logged into a user account associated with the external application when the actuation is received, in response to detecting the actuation of the hyperlink, determining whether the user has previously authorized credential sharing with the external application, in response to determining that the user has not previously authorized the credential sharing with the external application, prompting the user to share authentication credentials with the external application, in response to detecting user approval, sending the authentication credentials to the external application, in response to receiving confirmation that the user is authenticated by the external application, providing access, to a resource associated with the hyperlink without requiring the user to log into the external application user account.

Additional embodiments of the invention are directed to a method for granularly restricting user access within a group-based communication system comprising an automated workflow, wherein the automated workflow comprises at least one step performed in response determining that a trigger condition has been met.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
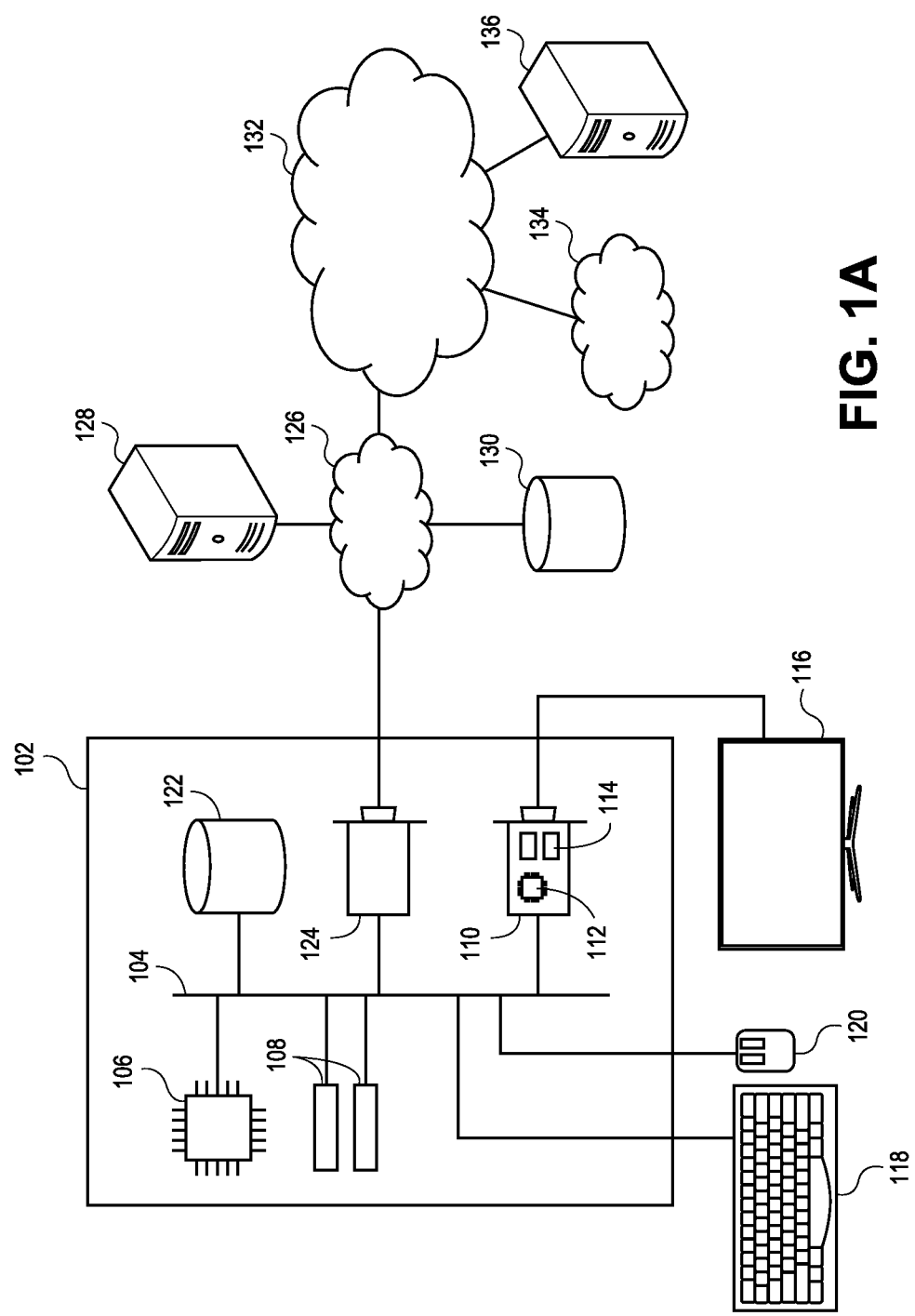
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

It should be understood that, in some embodiments, any of the components described with respect to FIG. 1A may be included in a mobile device. For example, in some embodiments, computer 102 and its contents are comprised within a mobile phone. Similarly, embodiments are contemplated where each of display 116, keyboard 118, and mouse 120 are replaced with a touch screen of a mobile device.

Figure 1B:
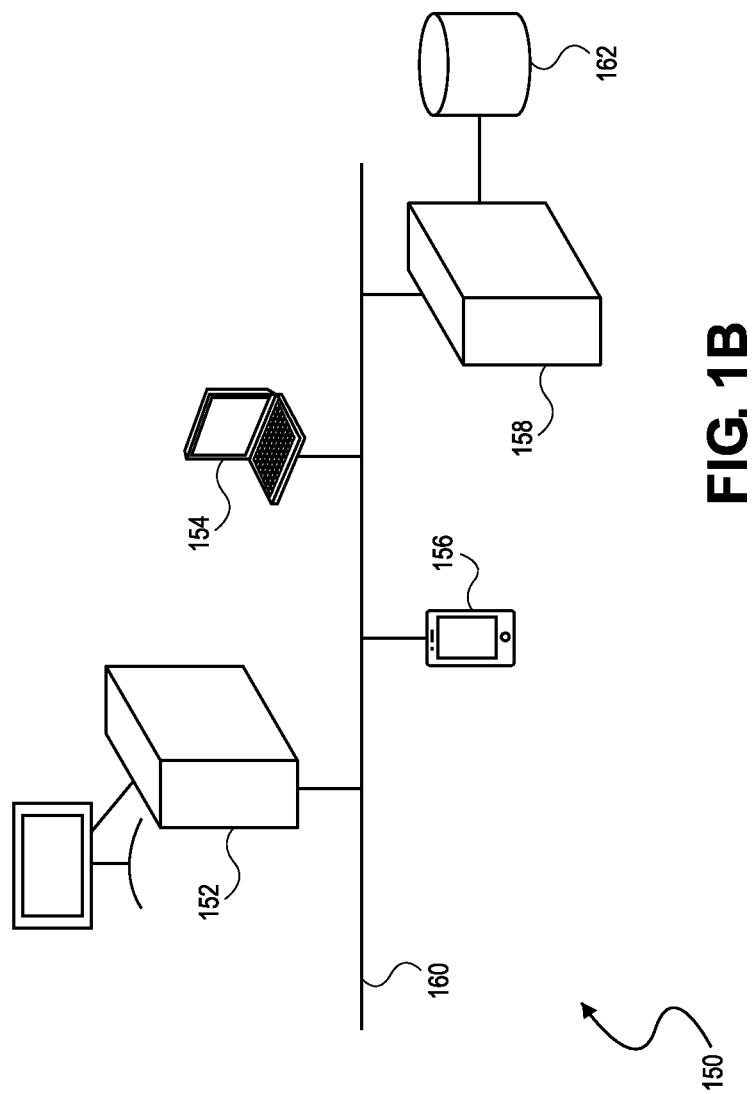
FIG. 1B depicts an exemplary diagram illustrating components of a system for carrying out embodiments of the invention.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communication system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the operations described herein with respect to a processor may be carried out by the processors within any of the devices described herein. For example, in some embodiments, a processor within the group-based communication system server 158 may perform a first operation, while a processor within the client device performs a second operation.

Figure 2:
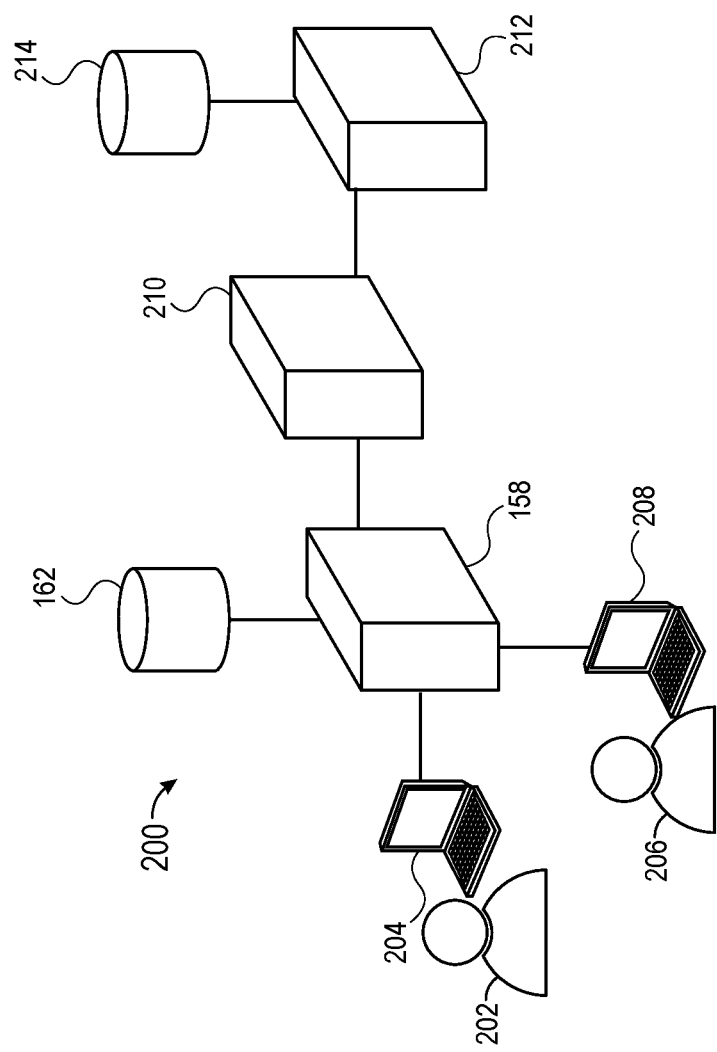
FIG. 2 depicts a system for linking identity information relating to some embodiments of the invention.

Turning now to FIG. 2, a system 200 for linking identity information is depicted relating to some embodiments. The system 200 comprises the group-based communication system server 158 and the group-based communication system data store 162. A first user 202 uses a first user device 204, which may be any of a desktop computer, a laptop computer, a mobile phone, a tablet, or any other type of user device suitable to access the group-based communication system. In some embodiments, the first user 202 uses the first user device 204 to interact with the group-based communication system server 158. In some embodiments, a second user 206 may use a second user device 208 to interact with the group-based communication system server 158.

Each of the first user 202 and the second user 206 may be associated with a unique group-based communication system user account. Information related to the group-based communication system user accounts for each user may be stored within the group-based communication system data store 162 accessible to the group-based communication system server 158. For example, in some embodiments, a first group-based communication system user account associated with the first user 202 may be stored in group-based communication system data store 162 and a second group-based communication system user account associated with the second user 206 may also be stored in the group-based communication system data store 162.

In some embodiments, the group-based communication system data store 162 stores various user information relating to the group-based communication system user accounts, such as, for example, user information and credentials including a user email address, a username, authentication information, a login password, or other types of user information. In some embodiments, the user information may be stored on the group-based communication system data store 162 as attributes for the respective user account. In such embodiments, various fields of the user information attributes may be selectably updated, modified, or new user attributes may be added, as well as new user accounts created.

In some embodiments, the second user 206 may be an administrative user with additional permission associated with the second user's account within the group-based communication system. For example, the second user 206 may have access to confirm or deny various actions from the first user 202. In some embodiments, the permissions associated with each group-based communication system user account may be configurable by an administrative user or by an owner of an organization. It should also be understood that in some embodiments, each of the first user 202 and the second user 206 belong to the same organization. Alternatively, in some embodiments, each user belongs to a different organization.

In some embodiments, the group-based communication system server 158 communicates with a web server 210. In such embodiments, the communication may be carried out over a network, such as network 160. The web server 210 further communicates with an external application 212, which may also be carried out over network 160. In some embodiments, the external application 212 is communicably coupled to an external application data store 214 storing information relating to the external application 212, such as external application user accounts and user information. In some embodiments, the external application 212 is a third-party service. Further, in some embodiments, the external application 212 comprises an external application server.

It should be understood that, in some embodiments, the group-based communication system may be accessed in a variety of ways. For example, the group-based communication system may be accessed from an application (app) running on a user device such as a mobile phone. Alternatively, the group-based communication system may be accessed from within a web browser on a user device.

Figure 3A:
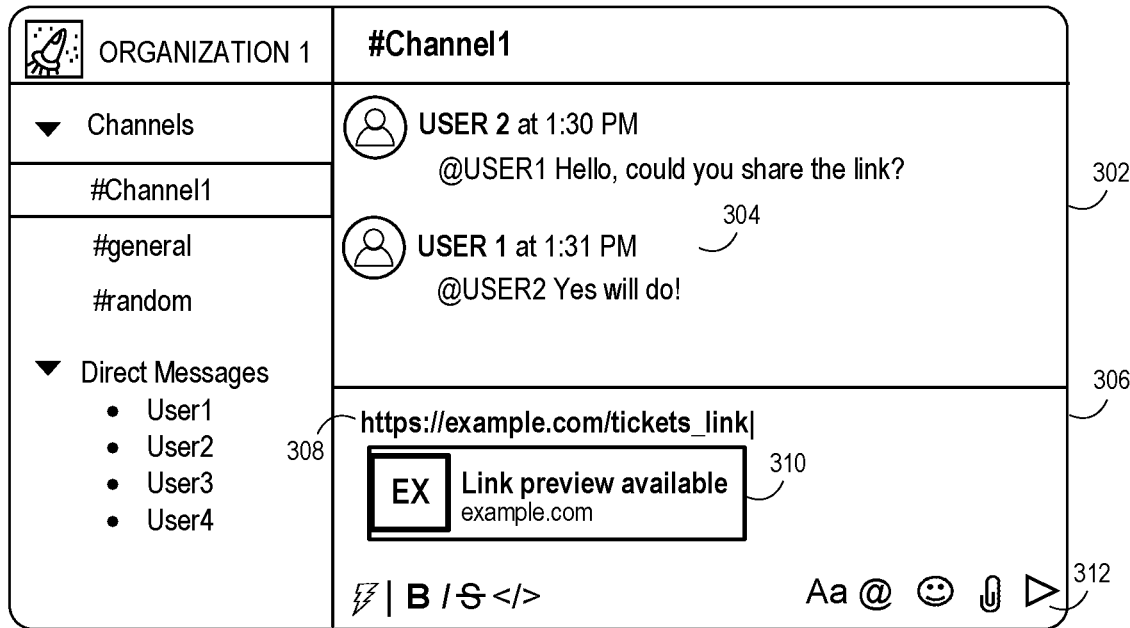
FIGS. 3A-3C illustrate a process for displaying a preview within a group-based communication system interface relating to some embodiments of the invention.
Figure 3B:
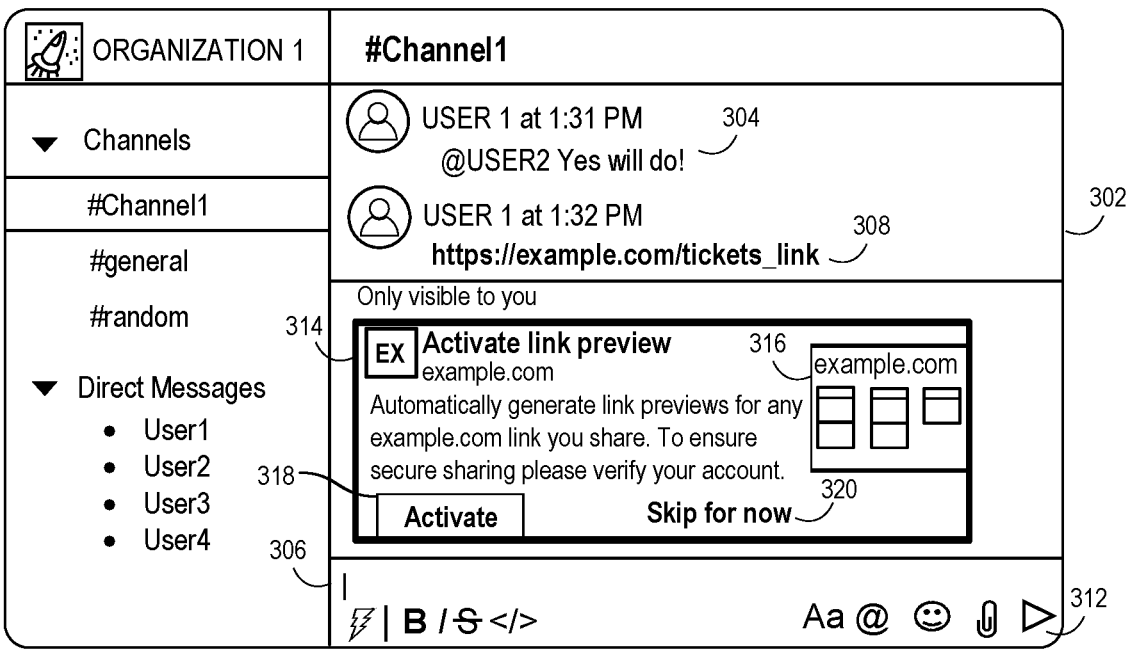
Figure 3C:
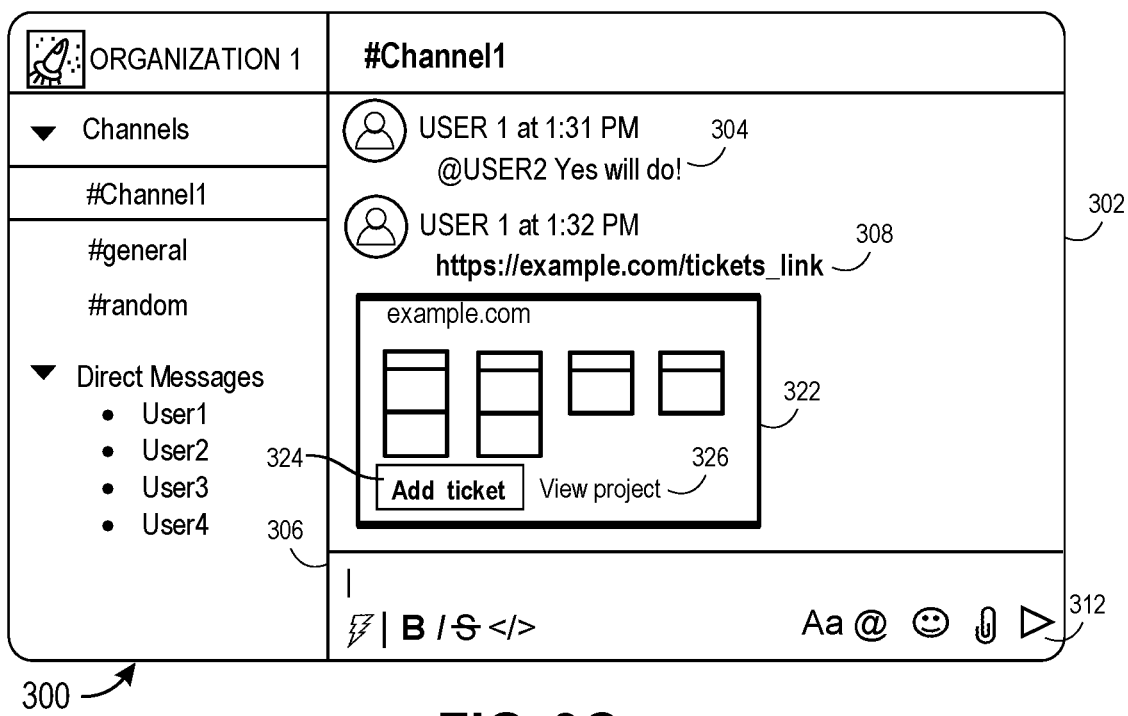

FIGS. 3A-3C illustrate a process for displaying a preview of content associated with a posted hyperlink 308 within the group-based communication system. In some embodiments, the group-based communication system interface 300 is displayed on a display of first user device 204 or second user device 208. Further, in some embodiments, the group-based communication system interface 300 may be part of an app and is displayed on a mobile user device such as a smartphone. Alternatively, in some embodiments, the group-based communication system interface 300 may be displayed within a web browser on a user device.

The group-based communication system interface 300, as shown in FIG. 3A, comprises a group-based communication channel pane 302 for displaying communications posted within the group-based communication channel. In some embodiments, the group-based communication channel pane 302 includes content posted to the group-based communication channel such as message 304 posted by a user of the group-based communication system. In some embodiments, the group-based communication system interface 300 further comprises a message composer 306 allowing users to prepare messages and other content to be posted within the group-based communication channel. In some embodiments, the user may type or paste the hyperlink 308 within the message composer 306 of the group-based communication system interface 300, as shown. Here, in some embodiments, the group-based communication system interface 300 may determine that a hyperlink has been added within the message composer 306 and in response to detecting the hyperlink 308, may display a preview notification 310 indicating to the user that a preview associated with the hyperlink 308 is available. For example, the preview may be determined based on a determination that a domain associated with the hyperlink is included in a list of known preview domains. Alternatively, the group-based communication server may communicate to a server associated with a domain in the hyperlink to determine whether a link preview is available.

It should be understood that in some embodiments, the preview notification 310 may be actuated by a user to configure a preview associated with the hyperlink 310 or to provide additional information about the link preview. The preview notification 310 may further include an indication of the external application to which the hyperlink is associated. In some embodiments, the preview notification 310 further comprises an example preview of the web resource for the posting user to review before posting the message including the hyperlink 308. In some situations, the preview may be restricted to authenticated or otherwise logged-in users. In such an example, no preview is generated if the user is not authorized to access the preview or content associated with the hyperlink. Instead, the group-based communication system may display a message that the user is not authorized to access the web resource or provide a warning that the preview cannot be generated without authentication.

In some embodiments, the message composer 306 further comprises a send button 312, that when actuated by the user, posts the content within the message composer 306 to the channel. For example, the user may click the send button 312 to share the hyperlink 308 within the group-based communication channel such that the hyperlink 308 is visible to other users within the group-based communication channel pane 302. Similarly, the send button 312 may be actuated by a user tapping a touch screen on a smartphone.

In some examples, the external application is a third-party service provider. For example, the external application may be a web service such as a ticketing service, a document hosting service, a planning service, or other web service. In some such examples, the web resource linked to by the hyperlink is accessible directly from the group-based communication system once the user has been authenticated. In some such examples, authentication of the user requires the user to provide account information to the third-party service provider. This may require the user to have an external user account with the third-party service provider. In some examples, the third-party service provider requires the user to be authenticated in order to access or preview the web resource without clicking on the hyperlink. In some such examples, upon clicking on the hyperlink, an unauthenticated user is redirected to a website hosted by the third-party service provider, where the user is then prompted to login prior to accessing the web resource. Alternatively, the user may be authenticated by virtue of being logged into the group-based communication system and agreeing to share their authentication information with the third-party service provider, as discussed in further detail below.

FIG. 3B illustrates the group-based communication system interface 300 after the hyperlink 308 has been posted within the group-based communication channel. Accordingly, the hyperlink 308 is visible within the group-based communication channel pane 302 along with the message 304 previously posted in the channel. In some embodiments, upon detecting that a hyperlink has been posted within the group-based communication channel, an ephemeral message 314 is displayed to the user who posted the hyperlink. For example, after the posting user posts the hyperlink 308 within the group-based communication channel, an ephemeral message 314 is displayed to the posting user, as shown. In some embodiments, the ephemeral message 314 may be displayed within the group-based communication channel pane 302 on the posting user's device. It should be understood that, in some embodiments, the ephemeral message 314 is only visible to the posting user and may not be displayed to other users of the group-based communication system.

In some embodiments, the ephemeral message 314 comprises dialogue notifying the posting user that a link preview will be automatically generated for the hyperlink 308 and that the posting user must verify their account, as shown. The ephemeral message 314 may also comprise a preliminary preview 316 displaying an example of the preview that will be displayed in the group-based communication channel. In some embodiments, the ephemeral message 314 further comprises an activation button 318 and a skip button 320. Here, the activation button 318 may be actuated by the posting user to activate the preview. In some embodiments, the posting user may be prompted to provide additional information upon actuating the activation button 318. For example, the posting user may be asked to share account verification information or authentication information such as user credentials. Alternatively, the skip button 320 may be actuated by the posting user to skip activation such that the preview is not displayed to other users within the group-based communication channel. In some embodiments, when the skip button 320 is clicked or tapped, the ephemeral message 314 is removed.

In some embodiments, if the skip button 320 is selected, no preview is generated. Instead, the group-based communication system interface 300 may remove or hide the ephemeral message. In some embodiments, the posting user may be able to access the ephemeral message 314 manually after skipping the ephemeral message 314. For example, if the posting user has already skipped the ephemeral message 314 but wishes to display the preview, the posting user may return to the ephemeral message 314 by interacting with the message including the hyperlink 308 in the group-based communication channel pane 302.

In some examples, the ephemeral message 314 is only shown temporarily or for a limited period of time after which the "skip for now" option is automatically selected. In some examples, the ephemeral message 314 may be regenerated when the user clicks on the hyperlink. In some examples, other metrics such as a time period, user type, the first time a message is viewed, etc. are used to determine when to display the ephemeral message 314.

It should be understood that, in some embodiments, the posting user may be prompted to configure a preview while a message including a hyperlink is being composed before the message is posted. Alternatively, in some embodiments, the posting user is prompted to configure the preview after the message including the hyperlink is posted. Further still, in some embodiments, the posting user may be prompted to configure the preview both before and after sending a message with a hyperlink.

FIG. 3C illustrates the group-based communication system interface 300 after the preview associated with the hyperlink 308 has been activated within the group-based communication channel. Accordingly, the hyperlink 308 is unfurled and a preview 322 is displayed within the group-based communication channel pane 302 with the hyperlink 308. In some embodiments, it may be desirable to include such a preview 322 to display additional information associated with the hyperlink 308. For example, many users may not trust or understand the purpose of a hyperlink without viewing additional information, such as a preview of the web resource.

Here, the preview 322 may be visible to all members of the group-based communication channel. In some embodiments, the preview 322 displays a preview of a web resource to which the hyperlink 308 is associated with. In some embodiments, the preview 322 may be an interactive preview comprising at least one actuatable button such that users may interact with the external application 212 from within the group-based communication system interface 302. For example, the preview 322 may comprise an add ticket button 324, as shown, such that users may add help tickets to a ticket project hosted within an external ticketing software, mark tickets resolved communicate with another user who posted the ticket, or otherwise interact with the ticket within the group-based communication system.

Additionally, it may be desirable that the preview 322 is an interactive preview such that users can interact with the resource from within the group-based communication system interface 300 without actually opening the hyperlink 308. In some embodiments, a user interaction with the interactive preview may cause information indicative of the user interaction to be sent from the group-based communication system server 158 to the external application 212. Here, the resource stored within the external application data store 214 may be updated with the information indicative of the user interaction. Accordingly, embodiments are contemplated where information is read, written, or edited on the resource by users from within the group-based communication system interface 300.

In some embodiments, users remain able to access the resource via the third-party system by actuating the hyperlink. In other embodiments, preview 322 replaces the hyperlink. In such embodiments, the preview 322 may comprise a view project button 326 that, when actuated, directs the user to the web resource. For example, a viewing user may tap or click the view project button 326 to open an instance of the ticketing software on the viewing user's device. In some embodiments, the ticket project within the ticketing software is automatically accessed from within a web browser or a separate application running on the viewing user's device.

Figure 4A:
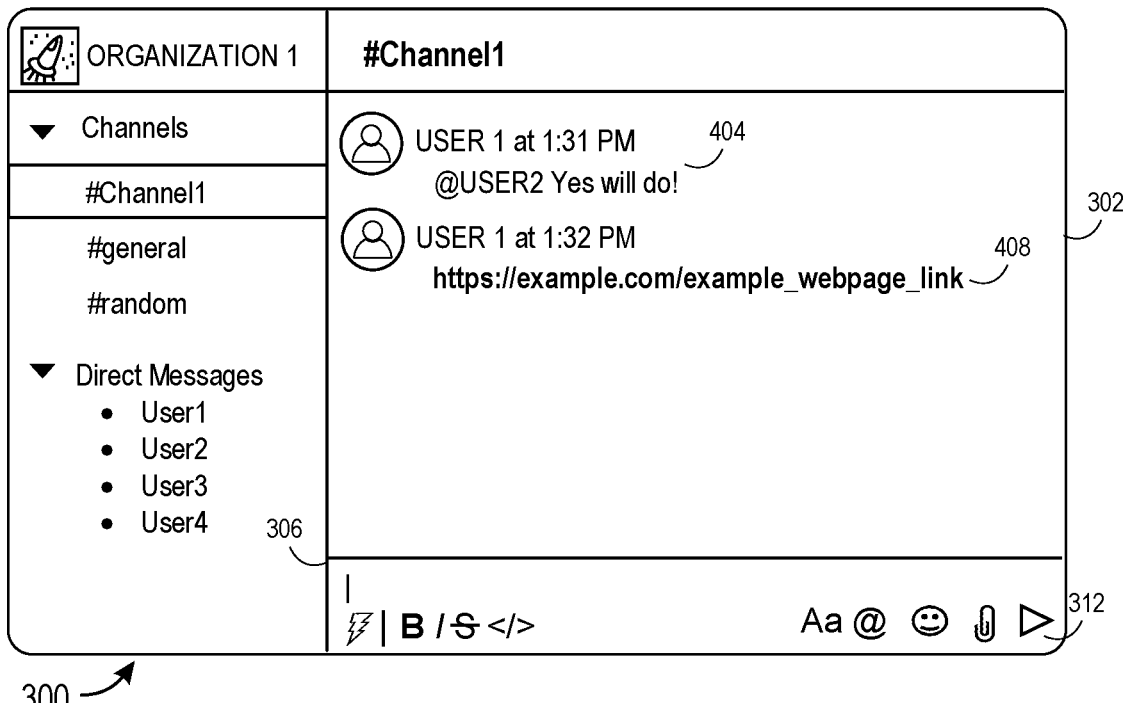
FIG. 4A depicts a group-based communication system interface relating to some embodiments of the invention.
Figure 4B:
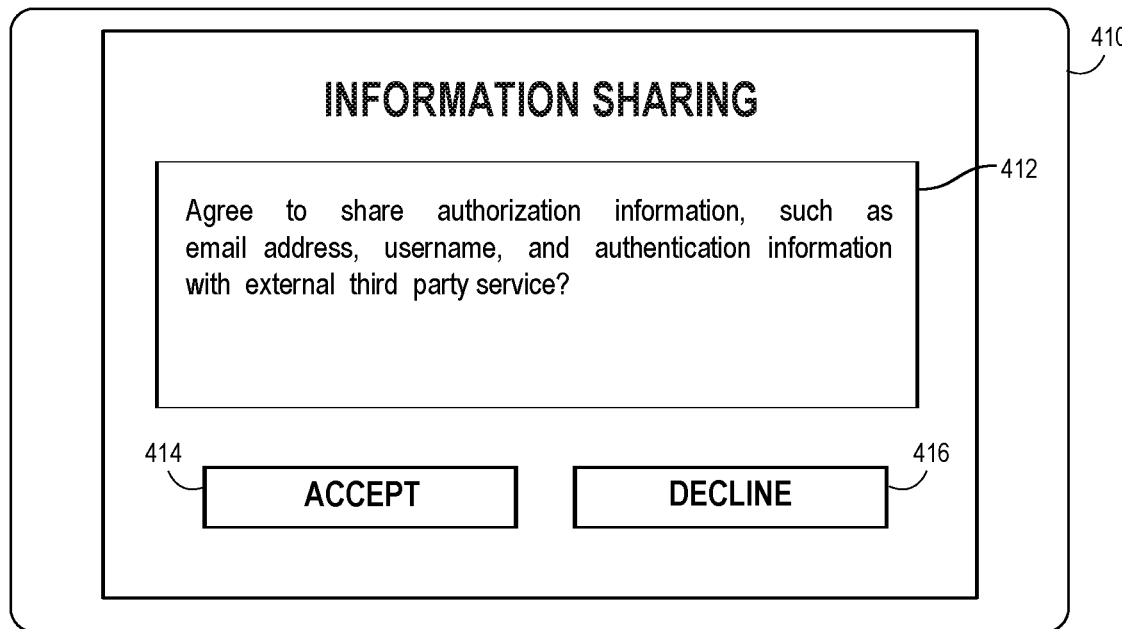
FIG. 4B depicts an interstitial dialogue relating to some embodiments of the invention.
Figure 4C:
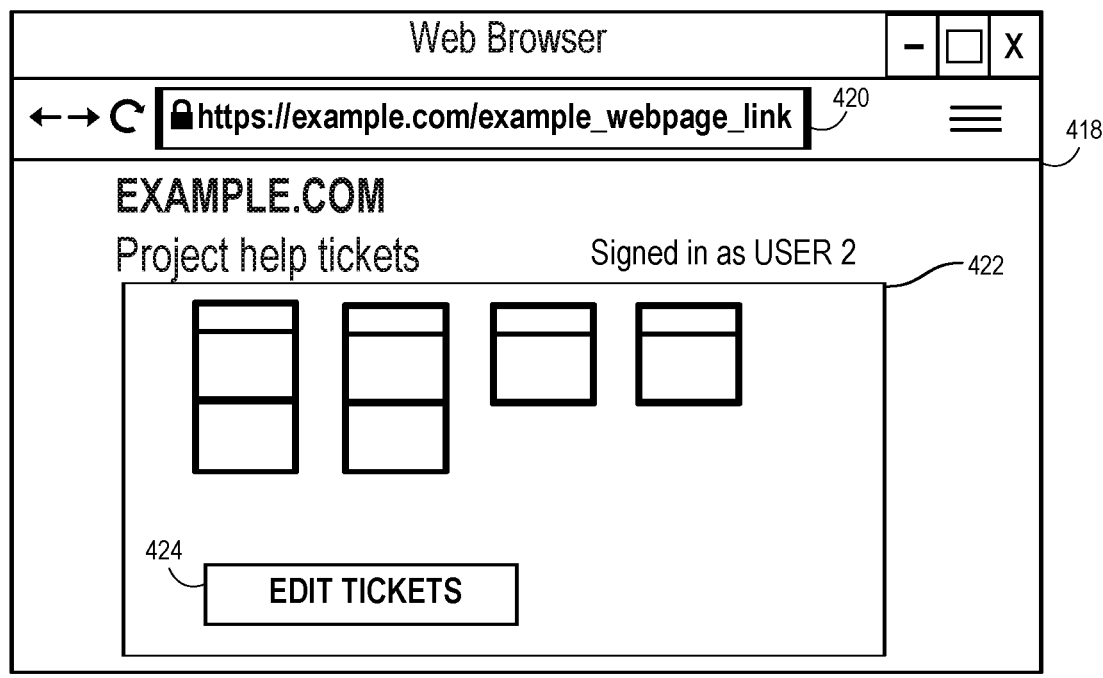
FIG. 4C depicts a web browser displaying a resource associated with a hyperlink relating to some embodiments of the invention.

FIGS. 4A-4C illustrate a process for identity linking within the group-based communication system. For example, such a process might be used to allow user to post or view previews requiring authentication without separately logging into the third-party application, as discussed with respect to FIGS. 3A-3C. FIG. 4A depicts the group-based communication system interface 300 with a message 404 and a hyperlink 408 posted within the group-based communication channel, visible within the group-based communication channel pane 302. In some embodiments, the hyperlink 408 may be the same as the hyperlink 308 discussed with respect to FIGS. 3A-3C. Alternatively, in some embodiments, the hyperlink 408 is a different hyperlink associated with a different resource. The group-based communication system interface 300 also comprises the message composer 306 with the send button 312, as shown. In some embodiments, the hyperlink 408 is shared within the group-based communication channel by a posting user using the message composer 306. Accordingly, the hyperlink 408 is visible to the members of the group-based communication channel including a plurality of viewing users.

FIG. 4B depicts an interstitial dialogue or user interface 410 prompting the user to share authentication information from the group-based communication system with the external application 212. In some embodiments, this dialogue may be displayed in response to an actuation of hyperlink 408 by the user. Accordingly, the interstitial dialogue may comprise text 412 asking the user to give permission to share authentication information with the external application 212. For example, the authentication information may include an email address, username, and other authentication information used to authorize the user within the external application 212. Further, the interstitial dialogue 410 may comprise an accept button 414 and a decline button 416. Here, the user may select the accept button 414 to accept the interstitial dialogue 410 and give permission to bundle and transfer the authentication information to the external application 212. Alternatively, the user may select the decline button 416 to decline the interstitial dialogue 410 and refuse to share the user's authentication information with the external application 212. In some embodiments, permissions are granted on a per-application basis. On other basis the user may grant (or opt to grant) a blanked permission for the group-based communication server to share authentication information with any linked application.

In some embodiments, the user's bundled authentication information is sent to the external application 212 in response to receiving acceptance of the interstitial dialogue 410 from the user. In some embodiments, the user may automatically be directed to the resource associated with the hyperlink 408 through a web browser or an application running on the user's device after accepting the dialogue. In some embodiments, further verification may be required from the user before sharing the users bundled authentication information. For example, the user may be required to provide multifactor authentication via their email address or phone number. Accordingly, a verification code may be sent to via the user's email address or phone number and the user may be prompted to enter the verification code to verify their account. In some embodiments, it may be desirable to include additional verification to enhance the security of the identity linking system such that malicious users do not gain access to user information.

In some embodiments, the interstitial dialogue 410 further comprises a terms of service form and a privacy policy from the third-party service. Additionally, in some embodiments, subsequent interstitial dialogues may be provided with the terms of service and privacy policy information for the user to review and accept or decline. Further, in some embodiments, the interstitial dialogue 410 comprises a warning that the user is leaving the group-based communication system and accessing the external application 212.

In some embodiments, the interstitial dialogue 410 may prompt the user to opt-in for receiving updates and promotional offers from the third-party service. For example, a selectable "receive updates" check box may be displayed on the interstitial dialogue 410 for the user to select such that updates and promotional offers from the third-party service are sent to the user's phone number or email address. Alternatively, the user may decline the "receive updates" check box such that updates and promotional offers are not sent to the user.

FIG. 4C depicts a web browser 418 displaying the resource associated with hyperlink 408. Here, the address bar 420 contains the uniform resource locator (URL) associated with hyperlink 408 that was used to access the web resource, as shown. As described above, in one example, the web resource may be a ticket project on a ticketing software. Accordingly, the web browser 418 may display project information 422 associated with the ticketing project. Further, an edit tickets button may be included such that the user can edit the project from the web browser 418. As described above, in some embodiments, the external application 212 may require the user to be signed in to access the web resource from the web browser 418. According to embodiments of the invention, information may be communicated from a client of the group-based communication system to the web browser to allow the user to access the web resource without logging in. By doing so, the user may be automatically and transparently signed into an external user account using the shared authentication information such that the user can access the web resource.

Figure 5:
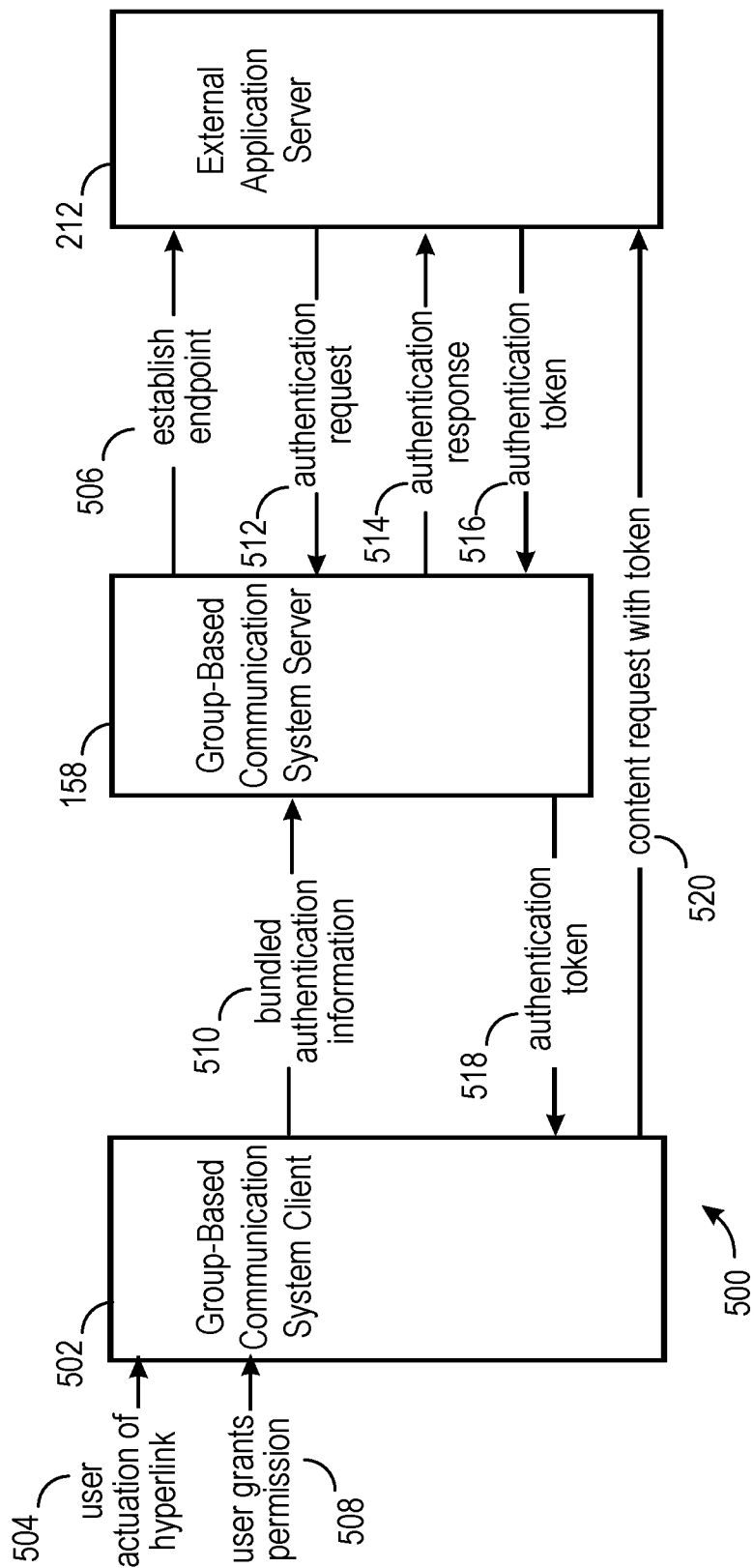
FIG. 5 depicts an authentication protocol relating to some embodiments of the invention.

Turning now to FIG. 5, an authentication protocol 500 for authenticating the user is depicted relating to some embodiments of the invention. In some embodiments, the authentication protocol 500 is carried out between a group-based communication system client 502 of the group-based communication system, the group-based communication system server 158, and the external application server 212. In some embodiments, the group-based communication system client 502 may be an instance of the group-based communication system running as an application on a user device or running within a web browser on the user device.

At step 504, user actuation of the hyperlink is received by the group-based communication system client 502. Here, the hyperlink may be either of the hyperlink 308 or 408, as shown in FIGS. 3A-3C and FIG. 4A, respectively. In some embodiments, the actuation may be received by the user clicking or tapping the hyperlink within the group-based communication system interface 300 displayed on the user's device. At step 506, an API endpoint is established between the group-based communication system server 158 and the external application server 212. In some embodiments, the API endpoint may be established in response to the group-based communication system client 502 receiving user actuation of the hyperlink. In some embodiments, the API endpoint may be established with the external application based on prior user engagement with the external application 212. At step 508, the user grants permission to share bundled authentication information with the external application 212. For example, this permission may be granted in response to an interstitial dialogue such as that depicted in FIG. 4B or on the basis of the user previously having accepted such a dialog for the external application server or having granted a blanked permission to share authentication information. At step 510, the bundled authentication information is sent to the group-based communication system server 158.

At step 512, an authentication request is sent from the external application server 212 to the group-based communication system server 158 requesting at least a portion of the bundled authentication information. In some embodiments, the request may be sent over the established communication endpoint. For example, this authentication may be in response to a request from the user to access the resource within the group-based communication system (not shown). Alternatively, authentication request 512 may be sent in response to group-based communication system server 152 establishing the endpoint. If the third-party service determines that the user does not have an account with the third-party service, because the identity of the user from the received credential information does not match a corresponding identity with the third-party service, then the user will be directed to create a new account with the third-party service. Alternatively, a new account may automatically be provisioned for the user, as described below. If the user does have an account, a link between the group-based communication and the third-party service is established.

If the third-party service determines that the user does not have an account with the third-party service, at step 514, an authentication response is transmitted from the group-based communication system server 158 to the external application server 212 over the established communication endpoint. In some embodiments, the authentication response comprises at least a portion of the bundled authentication information for which the user granted permission to share. Accordingly, given the authentication information the external application server 212 authenticates the user and provides an authentication token (or other information useable by the user to subsequently authenticate with the external authentication server) to the group-based communication system server 158 at step 516. Broadly, the authentication token 518 may include any information useable to confirm that the user is authorized to view the web resource associated with the hyperlink. For example, the authentication token may comprise an OAuth token, Kerberos ticket, authentication cookie, user password, or authentication challenge response. At step 518, the group-based communication system server 158 passes the authentication token to the group-based communication system client 502.

At step 520, the group-based communication system client 502 transmits a content request to the external application server 212 including the authentication token requesting access to content from the external application server 212 such as a web resource. In some embodiments, this content request is for displaying content within the group-based communication system. In other embodiments, this request is sent in order to display the external application resource in a web browser as depicted in FIG. 4C. Subsequently, the external application server 212 uses the authentication token to authenticate the user and provides access to the content in response to receiving the content request.

In one embodiment, the external application 212 may comprise a ticketing system used by members of a service organization to create and organize help tickets to service client help requests. Accordingly, a first user of the organization may create a ticket project within the ticketing system from within a web browser or application devoted to the ticketing system running on the first user's user device. The first user may wish to share the ticket project with other members of the organization by sharing a hyperlink to the ticket project within the group-based communication channel. Accordingly, the first user may type or paste the hyperlink 308 within the message composer 306 and post a message including the hyperlink 308 to the group-based communication channel. In response to the message including the hyperlink 308 being posted within the group-based communication system, the group-based communication system server establishes the API endpoint with a ticketing server of the ticketing system.

After the endpoint has been established, the first user is prompted to share authentication information including the first user's credentials from the group-based communication system with the ticketing system. If the user grants permission to share their authentication information with the ticketing system, the authentication information is bundled and sent from the group-based communication system server 158 to the ticketing server within an authentication response. After receiving the bundled authentication information comprising the first user's credentials, the ticketing server uses the first user's credentials to determine whether the first user has an existing ticketing system user account with the ticketing system. Here, the ticketing server may query a database storing user information using the first user's credentials to identify the existing ticketing system user account. Here, in some embodiments, the ticketing server may use the first user's email address to locate an existing user account of the ticketing system associated with the same email address.

After identifying the existing ticketing system user account, the ticketing server links the existing ticketing system user account with the first user's group-based communication system user account. In some embodiments, linking the accounts further comprising converting a group-based communication system identifier of the first user into a ticketing system identifier. After the accounts have been linked, the ticketing server sends a token to the group-based communication system server 158 which can be used by the group-based communication system client 502 to access content on the ticketing server such as the ticket project.

Alternatively, if an existing ticketing system user account cannot be found, the ticketing server may provision a new ticketing system user account for the first user based on the user's credentials and link the new ticketing system user account to the first user's group-based communication system user account. In some embodiments, the user is prompted to create a new account with the ticketing system.

In some embodiments, after the user has authorized sharing of their authentication credentials with the external application 212, the group-based communication system server 158 updates the external application 212 whenever the user's authentication credentials are changed within the group-based communication system. For example, if a user updates their email address and has already authorized sharing their authentication credentials with the external application 212, the group-based communication system server 158 may automatically send the updated email address of the user to the external application 212. In some embodiments, after changing their authentication credentials within the group-based communication system, users may be prompted to authorize the change to be updated with the external application 212. Further, in some embodiments, the user's authentication credentials may be updated whenever the user attempts to access a resource of the third-party service or attempts to login to the third-party service.

Figure 6:
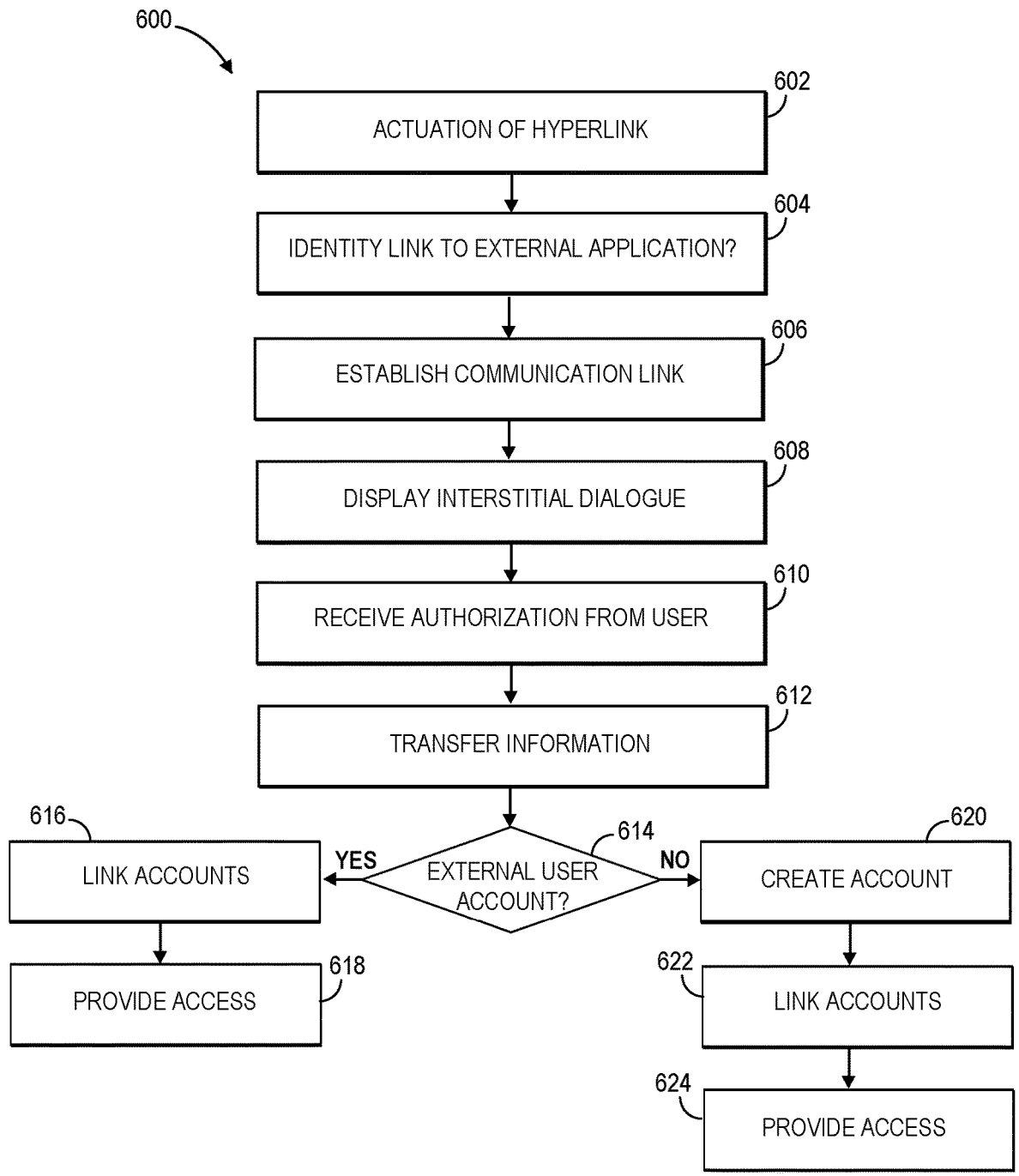
FIG. 6 depicts a method for linking identity information relating to some embodiments of the invention.

Turning now to FIG. 6, a method 600 for linking identity information is depicted relating to some embodiments of the invention. At step 602, the hyperlink is actuated. Here, the hyperlink may be any of hyperlink 308, hyperlink 408, or another hyperlink posted within the group-based communication system. Further, the hyperlink may be actuated by a user clicking or tapping the hyperlink on a user device. It may be desirable to store information indicating previously established identity links of users within the group-based communication system. For example, identity link information may be stored within the group-based communication system data store 162. Accordingly, at step 604, it is determined whether the user has an existing identity link to the external application 212. If it is determined that the user has an existing identity link to the external application, then the remaining steps of method 600 may be skipped and the user may be automatically provided access to the web resource associated with the hyperlink using a previously provided authentication token.

Alternatively, if it is determined that the user does not have an identity link to the external application 212, method 600 continues to step 606 where a communications link is established between the group-based communication system server 158 and the external application server 212. In some embodiments, the communications link is established via a persistent API endpoint provided by the third-party application server. At step 608, the interstitial dialogue 410 is displayed to the user prompting the user to grant permission to share authentication information with the external application 212. At step 610, authorization is received from the user. Here, the authorization may be received by the user selecting the accept button 414, as shown in FIG. 4B.

At step 612, in response from receiving authorization from the user, the user's authentication information is transferred to the external application 212 over the communication link. In some embodiments, the transferred authentication information comprises at least a portion of the bundled authentication information from the group-based communication system, such as an email address, a username, a password, or other authentication information of the user. At decision 614, it is determined whether an external user account exists for the user on the external application 212. Here, the external application 212 may use the received authentication information for the user to search for an existing external user account. If the user has an external user account, the external user account is linked to the user's group-based communication system user account at step 616. At step 618, the user is provided access to the web resource associated with the hyperlink. In some embodiments, the user may be automatically directed to the web resource within the web browser 418. Further, the user may be automatically signed into the external user account.

Alternatively, if the user does not have an external user account at decision 614, an external user account is provisioned for the user at step 620 based on the received authentication information. For example, if a company identified by a domain associated with a user's email address has a corporate account with the third-party application, a new account for the user can automatically be created under the umbrella of the corporate account. In some embodiments, if an administrator of the corporate account so indicates, the user account may be retroactively deprovisioned. At step 622, the external user account is linked to the user's existing group-based communication system user account. At step 624, the user is provided access to the web resource associated with the hyperlink.

It should be understood that linking accounts, in some embodiments, enables the user to be automatically authenticated in one account when the user is logged into a linked account. For example, if the user is logged into the group-based communication system user account, the user will have access to resources associated with the linked external user account.

Figure 7:
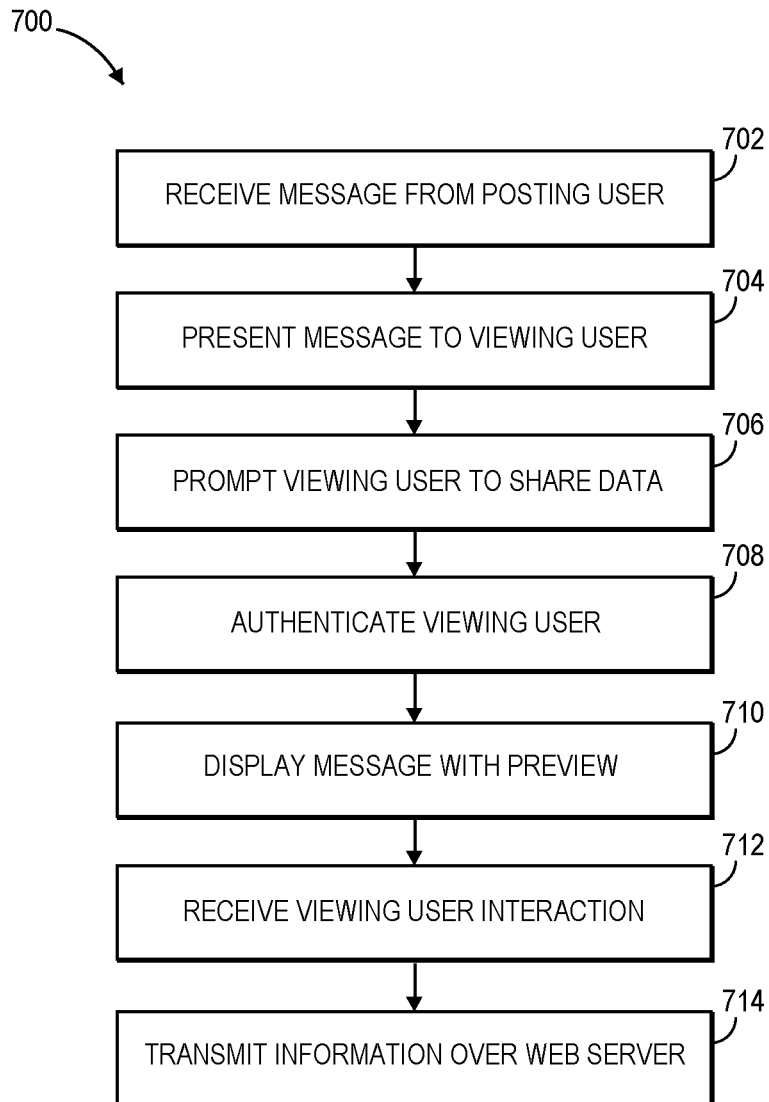
FIG. 7 depicts a method for displaying an interactive preview relating to some embodiments of the invention.

Turning now to FIG. 7, a method 700 for displaying an interactive preview within the group-based communication system is depicted relating to some embodiments of the invention. At step 702, a message containing a hyperlink is received from a posting user. Here, the posting user may have submitted the message using the message composer 306 of the group-based communication system interface 300. At step 704, the message is presented to a viewing user within the group-based communication system interface 300. For example, the message may be displayed within the group-based communication channel pane 302, as shown in FIG. 4A.

In some embodiments, the posting user has further activated a preview associated with the hyperlink such as preview 322 of FIG. 3C. However, in some embodiments, authentication may be required from the viewing user to access the preview 322. Accordingly, the viewing user is prompted to share authentication information with the external application 212 at step 706. In some embodiments, an interstitial dialogue similar to the interstitial dialogue 410 of FIG. 4B may be displayed to the viewing user requesting that the viewing user grant permission to share authentication information with the external application 212. If a user has already shared authentication information, step 708 may be skipped as the external application 212 is already linked to the user's account.

At step 708, if the viewing user grants permission to share the authentication information, the viewing user is authenticated in accordance with the previously described authentication protocol. At step 710, the preview 322 is displayed to the viewing user along with the message. In some embodiments, the message and preview 322 are displayed within the group-based communication channel pane 302, as shown in FIG. 3C.

In some embodiments, it may be desirable to allow identity-linking policies associated with the external application hyperlinks and link previews to be configured by a user, such as an administrator user or a user with specific access. Accordingly, the user may specify policies to adjust settings and permissions associated with the external application 212. For example, an administrator user or a user with access to said policies may define a list of domains which are allowed to display link previews within the group-based communication system and domains for which authentication information can be shared. In some embodiments, the domains may be defined by either of a specific domain or a wildcard domain associated with a plurality of subdomains. In some embodiments, the user may configure the policies to disable or enable identity linking through authentication information sharing at least partially within the group-based communication system. It should be understood that, in some embodiments, policies may be defined granularly and contextually such that identity linking policies may be specific to certain group-based communication channels, user, workspaces, or organizations.

Additionally, in some embodiments, administrators and users with specific visibility access may have visibility into identity link information. For example, users may be able to view a list of allowed domains associated with identity linking. In some embodiments, users may be able to view a list of external applications that have identity links enabled within the group-based communication system or within a specific organization, workspace, or channel of the group-based communication system. Additionally, users may be able to view which users have linked accounts with external applications.

In some embodiments, the group-based communication system server provides a list of allowed domains which may be used in accordance with the identity linking processes described herein. Accordingly, the list of allowed domains may be retrieved from the group-based communication system data store 162 and updated periodically. For example, in one embodiment, the group-based communication system runs as an application on a mobile phone of a user and the list of allowed domains is refreshed upon startup of the application. Alternatively or in addition, in some embodiments, it may be desirable to refresh the list of allowed domains more frequently or upon user request.

In some embodiments, developers of external applications may register and subscribe to domains within the group-based communication system. Additionally, in some embodiments, it may be desirable to verify the domains registered within the group-based communication system. Accordingly, the group-based communication system server 158 may determine whether the developer is actually associated with the domain by transmitting a verification request to the domain to verify the domain. Upon receiving a verification confirmation response the verification challenge is completed and the domain is verified.

It should be understood that a single developer may employ a plurality of different domains and that each of the domains may be defined by a single domain name or a wildcard domain name associated with a plurality of subdomains. In some embodiments, only verified domains are allowed to receive authentication information or interact through interactive previews. Alternatively, in some embodiments, unverified domains may be allowed certain permissions. For example, an unverified domain may display a standard preview within the group-based communication system, but not allowed to display an interactive preview or receive authorization information to enhance security of the group-based communication system.

In some embodiments, developers of the external application 212 are allowed to configure previews for resources on the external application 212. For example, in some embodiments, a preview-configuration interface may be displayed to developers of the external application 212 such that the developers can configure how the preview will be displayed within the group-based communication system. In some embodiments, developers may send images, HTML iframes, or other information to the group-based communication system to be used as previews for various resources of the external application 212. Further, the developers may configure interactive previews by selecting what actions may be taken from within the group-based communication system interface 300. For example, a developer may configure an interactive preview allowing users of the group-based communication system to write data to a spreadsheet of the external application 212 from within the group-based communication system interface 300.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for linking identity information between a first application and an external application, the method comprising:
  detecting a user engagement with an external application resource associated with the external application from within the first application, wherein the external application is distinct from the first application, wherein the user is not logged into a user account associated with the external application when the engagement is received;
  in response to detecting the engagement with the external application resource determining whether the user has previously authorized credential sharing with the external application;
  in response to determining that the user has not previously authorized the credential sharing with the external application, prompting the user to share authentication credentials with the external application;
  in response to detecting user approval, sending the authentication credentials to the external application;
  in response to determining that the user is authenticated by the external application, providing the user access to the external application resource requiring the user to log into the external application user account; and
  in response to determining that the user is not authenticated by the external application, creating and provisioning the external application user account for the user based on the authentication credentials, wherein the provisioning of the external application user account can be retroactively rescinded.

2. The computer-readable media of claim 1, the method further comprising:
  in response to creating and provisioning the external application user account, notifying an administrative user of the external application user account.

3. The computer-readable media of claim 1, the method further comprising, in response to detecting user approval, storing confirmation that the user has authorized credential sharing with the external application.

4. The computer-readable media of claim 1, wherein the external application requires that the user be logged into the user account associated with the external application to access the external application resource.

5. The computer-readable media of claim 1, the method further comprising:
  receiving a revocation request from the user; and
  revoking access from the external application to the authentication credentials based on the revocation request.

6. The computer-readable media of claim 1, wherein a subsequent engagement with the external application resource in the first application, after the user has authorized credential sharing with the external application, does not prompt the user to share authentication credentials with the external application.

7. A method for linking identity information between a first application and an external application, the method comprising:
  detecting a user engagement with an external application resource associated with the external application from within the first application, wherein the external application is distinct from the first application, wherein the user is not logged into a user account associated with the external application when the engagement is received;
  in response to detecting the engagement with the external application resource, determining whether the user has previously authorized credential sharing with the external application;
  in response to determining that the user has not previously authorized the credential sharing with the external application, prompting the user to share authentication credentials with the external application;
  in response to detecting user approval, sending the authentication credentials to the external application;
  in response to determining that the user is authenticated by the external application, providing the user access to the external application resource requiring the user to log into the external application user account; and
  in response to determining that the user is not authenticated by the external application, creating and provisioning the external application user account for the user based on the authentication credentials, wherein the provisioning of the external application user account can be retroactively rescinded.

8. The method of claim 7, further comprising:
in response to creating and provisioning the external application user account, notifying an administrative user of the external application user account.

9. The method of claim 7, further comprising, in response to detecting user approval, storing confirmation that the user has authorized credential sharing with the external application.

10. The method of claim 7, wherein the external application requires that the user be logged into the user account associated with the external application to access the external application resource.

11. The method of claim 7, further comprising:
receiving a revocation request from the user; and
revoking access from the external application to the authentication credentials based on the revocation request.

12. The method of claim 7, wherein a subsequent engagement with the external application resource in the first application, after the user has authorized credential sharing with the external application, does not prompt the user to share authentication credentials with the external application.

13. A system for linking identity information within a first application, the system comprising:
a data store; and
a server associated with the first application including a processor and one or more non-transitory computer-readable media storing instructions that, when executed by the processor, perform a method for linking identity information between the first application and an external application, the method comprising:
detecting a user engagement with an external application resource associated with the external application from within the first application, wherein the external application is distinct from the first application, wherein the user is not logged into a user account associated with the external application when the engagement is received;
in response to detecting the engagement with the external application resource, determining whether the user has previously authorized credential sharing with the external application;
in response to determining that the user has not previously authorized the credential sharing with the external application, prompting the user to share authentication credentials with the external application;
in response to detecting user approval, sending the authentication credentials to the external application;
in response to determining that the user is authenticated by the external application, providing the user access to the external application resource requiring the user to log into the external application user account; and
in response to determining that the user is not authenticated by the external application, creating and provisioning the external application user account for the user based on the authentication credentials, wherein the provisioning of the external application user account can be retroactively rescinded.

14. The system of claim 13, further comprising:
in response to creating and provisioning the external application user account, notifying an administrative user of the external application user account.

15. The system of claim 13, further comprising, in response to detecting user approval, storing confirmation that the user has authorized credential sharing with the external application.

16. The system of claim 13, wherein the external application requires that the user be logged into the user account associated with the external application to access the external application resource.

17. The system of claim 13, further comprising:
receiving a revocation request from a second user; and
revoking access from the external application to the authentication credentials based on the revocation request.

\* \* \* \* \*